(No Model.)
R. W. & T. J. CAVE.
VEHICLE WHEEL.
No. 403,915. Patented May 28, 1889.
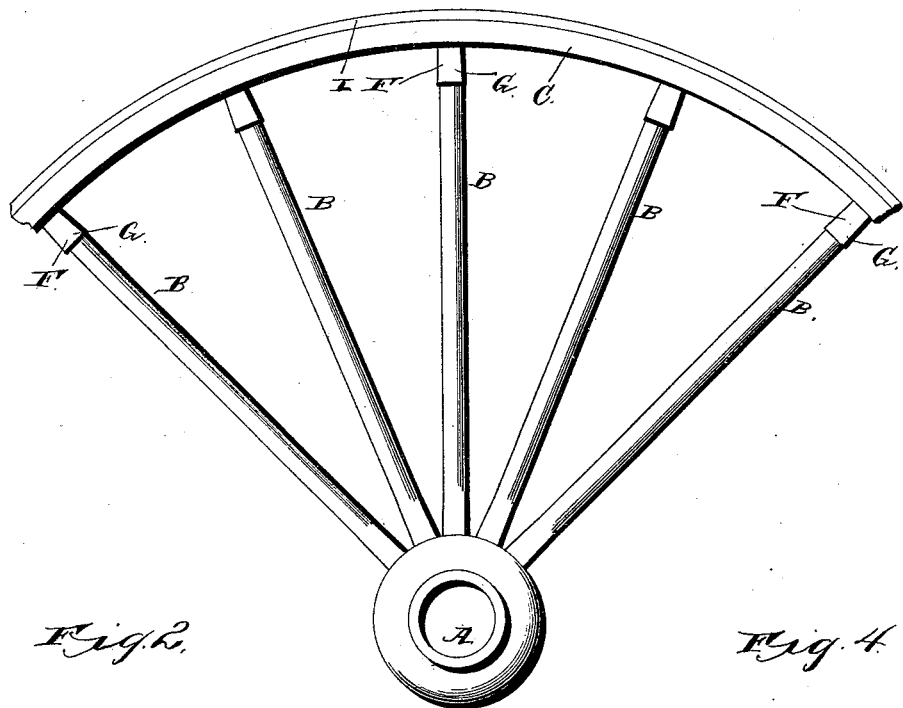
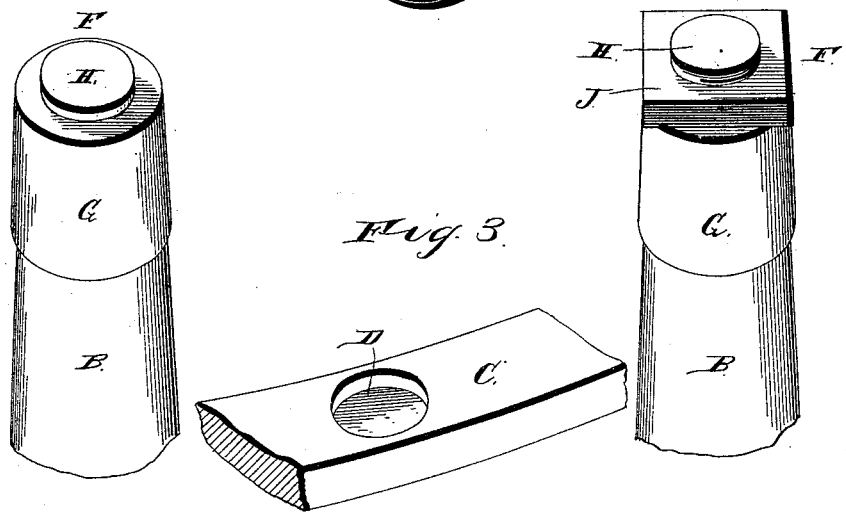
Witnesses,
Geo. J. Thorpe
R. W. Bishop.
Inventors:
R. W. Cave.
T. J. Cave.
By their Attorneys
C. A. Snow & Co.
N. PETERS, Photo-Lithographer, Washington, D. C.

UNITED STATES PATENT OFFICE.

ROBERT WESLEY CAVE AND THOMAS JEFFERSON CAVE, OF PRICEVILLE, KENTUCKY.

VEHICLE-WHEEL.

SPECIFICATION forming part of Letters Patent No. 403,915, dated May 28, 1889.

Application filed August 15, 1888. Serial No. 282,774. (No model.)

*To all whom it may concern:*

Be it known that we, ROBERT WESLEY CAVE and THOMAS JEFFERSON CAVE, citizens of the United States, residing at Priceville, in the county of Hart and State of Kentucky, have invented new and useful Improvements in Wheels, of which the following is a specification.

Our invention relates to improvements in wheels; and it consists in certain novel features, hereinafter described and claimed.

In the accompanying drawings, Figure 1 is a side view of a portion of a wheel provided with our improvements. Fig. 2 is a detail view of the end of one of the spokes. Fig. 3 is a detail view of a portion of the metallic rim. Fig. 4 is a detail view showing a slight modification.

In carrying out our invention we employ a hub, A, and spokes B, of the usual or any preferred construction, fitted together in the ordinary manner. The metallic rim C is constructed of a wrought-iron band, bent into a true circular shape and having its ends welded together, thus forming a continuous unbroken rim. On the inner surface of this rim, at stated points along the same, we drill a series of recesses or depressions, D, corresponding in number to the spokes in the wheel.

F designates our improved spoke-socket, consisting of a metallic casting having a body, G, fitted on the end of the spoke, and having a tenon or projection, H, at its outer end adapted to enter the recesses D in the metallic rim. The sockets are secured on the ends of the spokes in any desired manner, and the rim is then heated, so that it will be expanded to a degree sufficient to cause it to fit loosely around the ends of the spokes. It is then placed in position around the said spokes, the recesses D being arranged adjacent to the tenons H of the spoke-sockets. The rim is then wet, so as to shrink upon the spoke-sockets, thereby giving the wheel the desired dish and securing the spokes firmly in place. A tire, I, is then secured around the rim in the usual manner; but this tire may, if desired, be dispensed with, as our metallic rim answers the double purpose of a felly and tire.

When our invention is applied to light buggy-wheels, it may sometimes be found desirable to provide a nut, J, on the spoke-socket between the shoulder at the end of the same and the inner face of the metallic rim. When the spokes have become loosened by continued use, these nuts can be turned out against the metallic rim, thereby forcing the spokes into the hub and tightening the wheel.

From the foregoing description, taken in connection with the accompanying drawings, it will be seen that we have provided a neat, light, and strong wheel, and its advantages are thought to be obvious.

Having thus described our invention, what we claim, and desire to secure by Letters Patent, is—

The herein-described improved vehicle-wheel, comprising the hub, the spokes, the spoke-sockets having short cylindrical tenons, and the metallic rim shrunk in place direct upon the spokes, and having recesses in its inner side registering with and accommodating the tenons of the spoke-sockets, substantially as set forth.

In testimony that we claim the foregoing as our own we have hereto affixed our signatures in presence of two witnesses.

ROBERT WESLEY CAVE.
THOMAS JEFFERSON CAVE.

Witnesses:
C. A. EPES,
J. W. WOODSON.